(12) United States Patent
Jin et al.

(10) Patent No.: US 8,346,751 B1
(45) Date of Patent: Jan. 1, 2013

(54) HIERARCHIAL CATEGORY INDEX NAVIGATIONAL SYSTEM

(75) Inventors: Zhiying Jin, Lexington, MA (US); Fenglin Yin, Lexington, MA (US); Sharon Marie Walker, Coppell, TX (US); Jennifer Logan Stelling, Southlake, TX (US); David A. Philbin, Arlington, MA (US); Demetrios Karis, Cambridge, MA (US); Hannah Y. Moon, Boston, MA (US); John S. Huitema, Arlington, MA (US); William Christopher Smith, Lewisville, TX (US)

(73) Assignee: Verizon Laboratories Inc., Waltham, MA (US)

( * ) Notice: Subject to any disclaimer, the term of this patent is extended or adjusted under 35 U.S.C. 154(b) by 1439 days.

(21) Appl. No.: 10/872,051

(22) Filed: Jun. 18, 2004

(51) Int. Cl.
*G06F 7/00* (2006.01)
*G06F 17/30* (2006.01)

(52) U.S. Cl. .................. 707/708; 707/724; 707/725

(58) Field of Classification Search .............. 707/705, 707/708, 722–725
See application file for complete search history.

(56) References Cited

U.S. PATENT DOCUMENTS

| | | | |
|---|---|---|---|
| 5,623,590 A | 4/1997 | Becker et al. | |
| 6,201,544 B1 * | 3/2001 | Ezaki | 345/419 |
| 6,278,940 B1 * | 8/2001 | Endo | 701/209 |
| 6,320,943 B1 * | 11/2001 | Borland | 379/112.01 |
| 6,336,073 B1 | 1/2002 | Ihara et al. | |
| 6,381,603 B1 * | 4/2002 | Chan et al. | 1/1 |
| 6,816,176 B2 | 11/2004 | Laffey et al. | |
| 7,155,339 B2 | 12/2006 | Tu | |
| 2002/0002552 A1 * | 1/2002 | Schultz et al. | 707/3 |
| 2002/0099605 A1 * | 7/2002 | Weitzman et al. | 705/14 |
| 2002/0130906 A1 | 9/2002 | Miyaki | |
| 2002/0140746 A1 | 10/2002 | Gargi | |
| 2003/0061211 A1 * | 3/2003 | Shultz et al. | 707/3 |
| 2004/0008225 A1 | 1/2004 | Campbell | |
| 2004/0204839 A1 | 10/2004 | Imanishi | |
| 2005/0085999 A1 | 4/2005 | Onishi | |
| 2005/0251331 A1 * | 11/2005 | Kreft | 701/207 |
| 2006/0041556 A1 * | 2/2006 | Taniguchi et al. | 707/10 |
| 2006/0109145 A1 | 5/2006 | Chen | |

OTHER PUBLICATIONS

HTML Checked—HTML Code Tutorial, www.htmlcodetutorial.com, archived Feb. 12, 2003, printed Dec. 3, 2010, 1 page.*

* cited by examiner

*Primary Examiner* — Vincent Boccio

(57) ABSTRACT

A map-based search application for map-based category navigation includes geographic data, category data, and categorized data comprising at least one item, wherein each item is associated with each of the geographic data and the category data. Accordingly, a user is enabled to search for categorized data that satisfies at least one condition related to the geographic data and at least one condition related to the category data. The invention further comprises a display for displaying a list of results from a search, wherein the list comprises the at least one item.

23 Claims, 10 Drawing Sheets

HIERARCHIAL CATEGORY INDEX NAVIGATIONAL SYSTEM

FIELD OF THE INVENTION

The present invention relates to electronic-based searching for items in a specified geographic area that are within a particular category or categories of information, as well as to accessing and displaying the results of such a search on a generated map.

BACKGROUND OF THE INVENTION

This application is related to U.S. application Ser. Nos. 10/872,266 entitled "STACKABLE ICONS", and 10/872,050 entitled "AUTOMATED SEARCH PARAMETER RESUBMISSION FOR MAP BASED SEARCHES, both of which are also assigned to the assignee of the present invention, and were filed the same day as the present application. The contents of the related applications are incorporated by reference their entirety.

Hierarchical category indices, in which information is arranged in a "tree" taxonomy, have long been well known. For example, naturalists from Aristotle to Linnaeus to Darwin and on down have arranged information about living things according to hierarchical categories. More recently, it has been known to arrange information, such as information in a directory such as a yellow pages directory, according to a hierarchical category index. Even more recently, it has been known to arrange information on the Internet, e.g., on the World Wide Web, according to hierarchical category indices. For example, many of today's web sites include "site maps" that display an organization of web pages in a web site according to a hierarchical category index. Further, numerous known web sites allow users to search for items, such as items in a directory, according to a hierarchical category index.

It is also well known to display maps of indicated geographic areas on the World Wide Web. Moreover, it is known to search for items in a directory, limiting the search to an indicated geographic area of interest. Then, when a search item is found, the location of the item may be indicated on a map of the indicated geographic area of interest.

Users often do not know, however, the specific name, or perhaps even the specific category, of the item for which they are searching. For example, users of online "yellow page" systems often know they want to find, for example, a florist in a particular area, without knowing the names or locations of any florists in that area.

Further, users may want to be able to concentrate their errands in a geographic area, and thus may want to know the locations of several different kinds of businesses in a particular area. To take just one example, a user might want to find dry cleaners, florists, and pharmacies in a particular geographic area. However, prior art systems are unable to present simultaneously this disparate information to a user; prior art yellow pages systems, for example, are unable to display a map showing the locations of all found items in all indicated categories of interest in an indicated geographic area.

Accordingly, there is a need for the ability to search for items according to both a category of interest and a geographic area of interest, and to further display search results according to both the category of interest and the geographic area of interest. A system that meets these needs would provide the benefit of allowing users to search for items in a geographic area according to a category even when they were not looking for a specific item. Moreover, such a system would provide the benefit of providing users with a visual, map-based presentation of all items in the category of interest in the geographic area of interest. Additionally, such a system would provide the benefit of providing users with a visual, map-based presentation of all categories of interest in the geographic area of interest.

Further, particularly in densely populated areas, it often happens that multiple items in a single category are located in the same, or practically the same, location. For example, a single mall, shopping center, or office building may contain many businesses, one or more of which are responsive to a request. For instance, certain office buildings contain many law firms, certain malls have many shoe stores, etc. One reason that prior art systems have not overcome the limitation of not being able to search for all items in a category in a geographic area and then showing the location of found items on a map is that prior art systems do not have the ability to effectively display multiple items at a single location on a map of a geographic area. Accordingly, there is a need for a system that effectively displays information about multiple items in the same location on a map.

The present invention overcomes the limitations of the prior art by enabling a user to search for all items in an indicated category within a geographic area, and then displaying icons representing the locations of found items on a map of the geographic area, and moreover effectively displaying information about items found at the same location on the map.

BRIEF SUMMARY OF THE INVENTION

A map-based search application for map-based category navigation includes geographic data, category data, and categorized data comprising at least one item, wherein each item is associated with each of the geographic data and the category data. Accordingly, a user is enabled to search for categorized data that satisfies at least one condition related to the geographic data and at least one condition related to the category data. The invention further comprises a display for displaying a list of results from a search, wherein the list comprises the at least one item.

Further, a method of finding items associated with a category and a geographic area of interest includes associating at least one item with each of the geographic area of interest and the category, receiving an indication of the geographic area of interest, receiving an indication of the category, and displaying a list of results from a search, wherein the list comprises the at least one item.

DETAILED DESCRIPTION

System Overview

Figure 1:
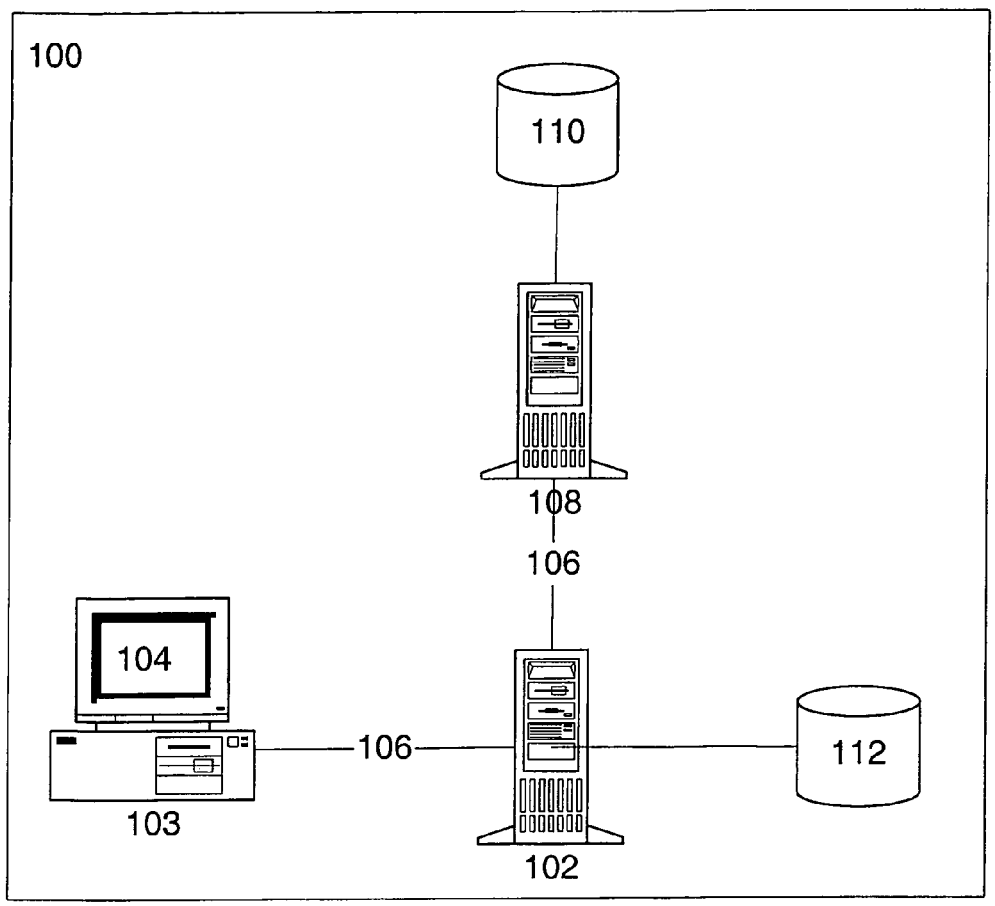
FIG. 1 depicts the physical infrastructure of an embodiment of the inventive system.

FIG. 1 depicts the physical infrastructure of an embodiment of the inventive system. Map-based search application 100 comprises server 102 and client 103 and further includes one or more computer programs and/or scripts. Server 102, which in many embodiments is a web server such as will be known to those skilled in the art, communicates with client 103 over a network 106. In one presently practiced embodiment network 106 is the Internet, although in other embodiments network 106 could be a local area network (LAN), wide area network (WAN), or any other kind of telecommunications or computer network known to those skilled in the art. In some embodiments, server 102 and client 103 are the same physical computing device. Client 103 is a computing device such as a laptop, notebook, desktop, or handheld computing device. Client 103 generally comprises a display 104 and one or more input devices such as a keyboard and/or pointing device or other input device as will be known to those skilled in the art. In some embodiments client 103 is capable of running a Web browser.

Server 102 also communicates with a map server 108. In one presently practiced embodiment server 102 communicates with map server 108 via network 106. However, those skilled in the art will recognize that server 102 could communicate with map server 108 using a network other than network 106 without departing from the scope of the present invention. In some embodiments server 102 and map server 108 could be the same machine. Map server 108 also communicates with a map database 110. When map database 110 is on a different machine, it is possible for map server 108 to communicate with map database 110 using network 106. In embodiments in which network 106 is the Internet, map server 108 generally communicates with map database 110 using a LAN or the like. Also, in some embodiments, map server 108 and map database 110 exist on one physical computing machine and/or are embodied in one software application. In one presently practiced embodiment, map server 108 and map database 110 are effectively replaced by an application service provider such as the Microsoft® Map-Point Web Service offered by Microsoft Corporation of Redmond, Wash., which we be known to those skilled in the art.

Server 102 also communicates with an information database 112. While it is possible for map server 108 to communicate with information database 112 using network 106, in embodiments in which network 106 is the Internet, server 102 generally communicates with information database 112 using a LAN or the like. Also, in some embodiments, server 102 and information database 112 exist on one physical computing machine and/or are embodied in one software application.

Information database 112 comprises both category data as well as item data, described in more detail below with reference to FIG. 2. In general, category data comprises data identifying different categories and the relationship or relationships between categories. Item data comprises data relating to items that are associated with one or more categories, as well as data identifying the category or categories with which each item is associated.

Hierarchical Category Index

Figure 2:
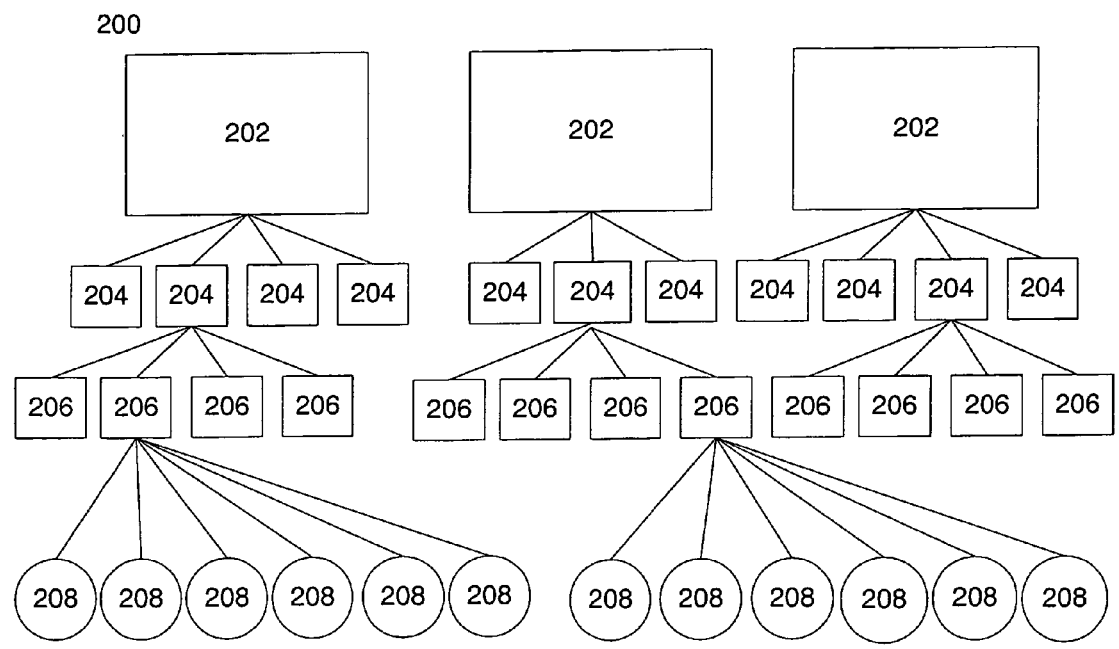
FIG. 2 depicts hierarchical category index such as is used in one presently practiced embodiment of the present invention.

FIG. 2 depicts hierarchical category index 200 such as is used in one presently practiced embodiment of the present invention. Hierarchical category index 200 is generally stored in information database 112. At the top level of hierarchical category index 200 is one or more category families 202. Within each category family 202 is one or more sub-families 204. Each sub-family 204 in turn comprises one or more categories 206. Within information database 112 each category 206 is indexed to, i.e., associated with, one or more items 208 that have been categorized. Within information database 112 each item is also associated with a location on a map, i.e., a particular geo-coordinate. Geo-coordinates, usually given by a data pair comprising a specific longitude and latitude, are well known. In one current embodiment, items 208 include businesses that are listed in a "yellow pages" directory, and category families 202, sub-families 204, and categories 206 represent different classifications of such businesses 208. Items 208 could also include residences, other institutions and/or geographic features such as park trails, bikes trails, restrooms, bus stations, airports, automatic teller machines (ATMs), scenic views, statues, monuments, historical points, pay phones, train stations, subway Stations, etc.

FIG. 2 depicts a hierarchy having four levels. Those skilled in the art will understand that the invention could be practiced with hierarchical category index 200 having fewer or greater than four levels. For example, the invention could be practiced with ten or any other number of levels of sub-families 204, or no levels of sub-families 204. One presently practiced embodiment of the present invention comprises approximately 15,000 categories, although the particular number of category families 202, sub-families 204, and categories 206 is not critical to the invention.

Further, instead of using hierarchical category index 200, the invention could be practiced with another kind of category index such as may be known to those skilled in the art. Two illustrative examples are as follows. First, those skilled in the art will understand that category information could be organized relationally rather than hierarchically. Those skilled in the art will understand that in a relational category index category families 202 and sub-families 204 could have relationships with each other, as could different categories 206. Second, category information could be stored in a single list, thus comprising a linear rather than a hierarchical index.

Map-Based Interface

Figure 3:
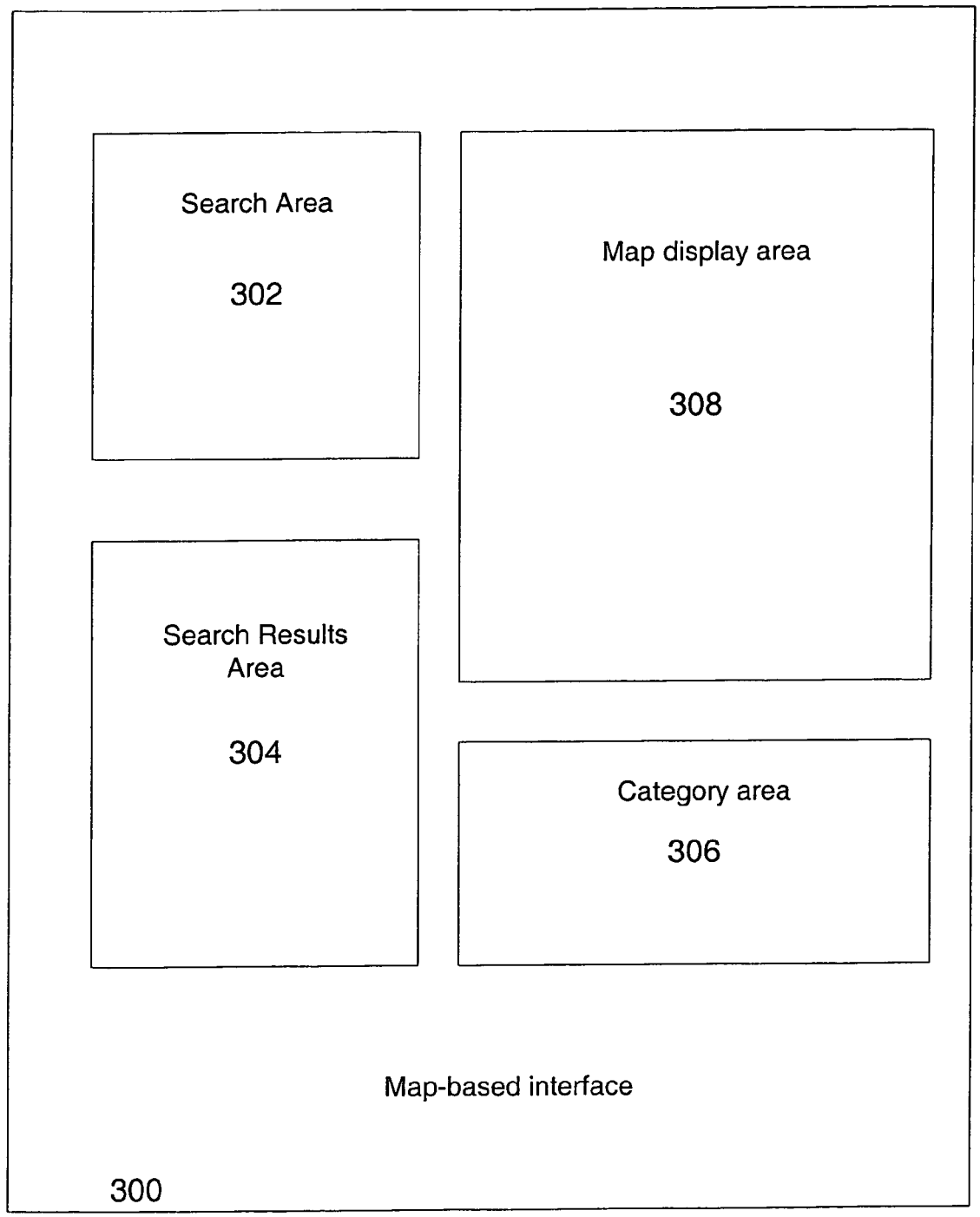
FIG. 3 provides an overview of a map-based interface as practiced in one embodiment of the present invention.

FIG. 3 provides an overview of map-based interface 300 to map-based search application 100 as practiced in one embodiment of the present invention. Map-based interface 300 is generally a graphical user interface (GUI) and generally will be presented on display 104, discussed above with reference to FIG. 1. While it is preferred to present map-based interface 300 using a web browser running on client 103, those skilled in the art will understand that such a presentation is not critical to the operation of the invention, and that map-based interface 300 could easily be presented on client 103 without using a web browser.

Search area 302 accepts user input relating to categories or items to be searched. As discussed in more detail below, search area 302 may present the user with a form 420 such as is depicted in FIG. 4B, a list of frequently-searched category families 202, sub-families 204, and categories 206 as depicted in FIG. 4C, or, as depicted in FIG. 4D, a list of all available category families 202 displayed in category browser 404. As described in more detail below, category browser 404 may be used to navigate to all category families 202 and all sub-families 204 and categories 206. In addition, as is also described in more detail below, category families 202 and all sub-families 204 and categories 206 may be accessed by using category box 406, item in item box 408, or frequently searched categories link 400.

Search results area 304 is used to list items found within selected category families 202, sub-families 204, and/or categories 206.

Figure 4A:
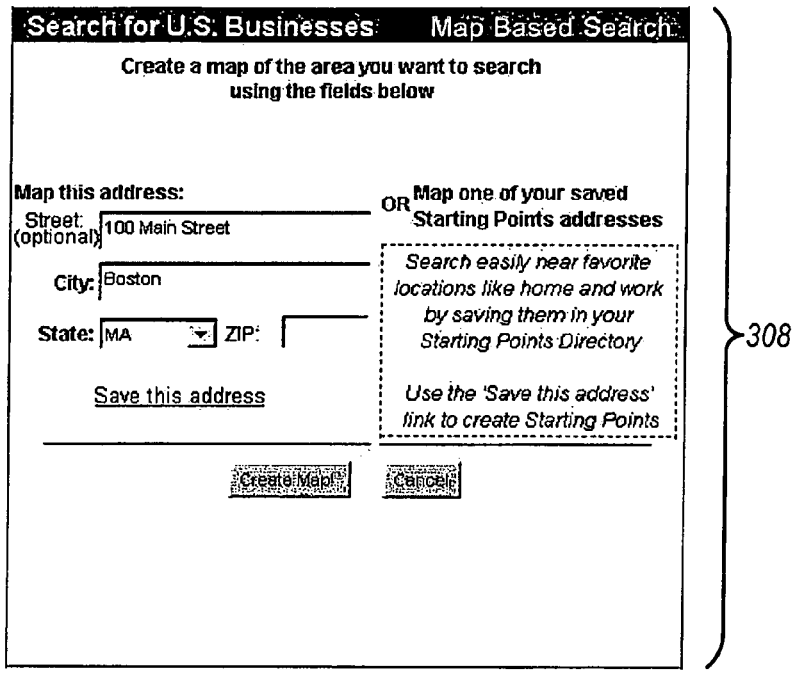
FIG. 4A depicts a portion of a graphical user interface according to some embodiments through which a user can indicate a geographic area of interest.
Figure 4B:
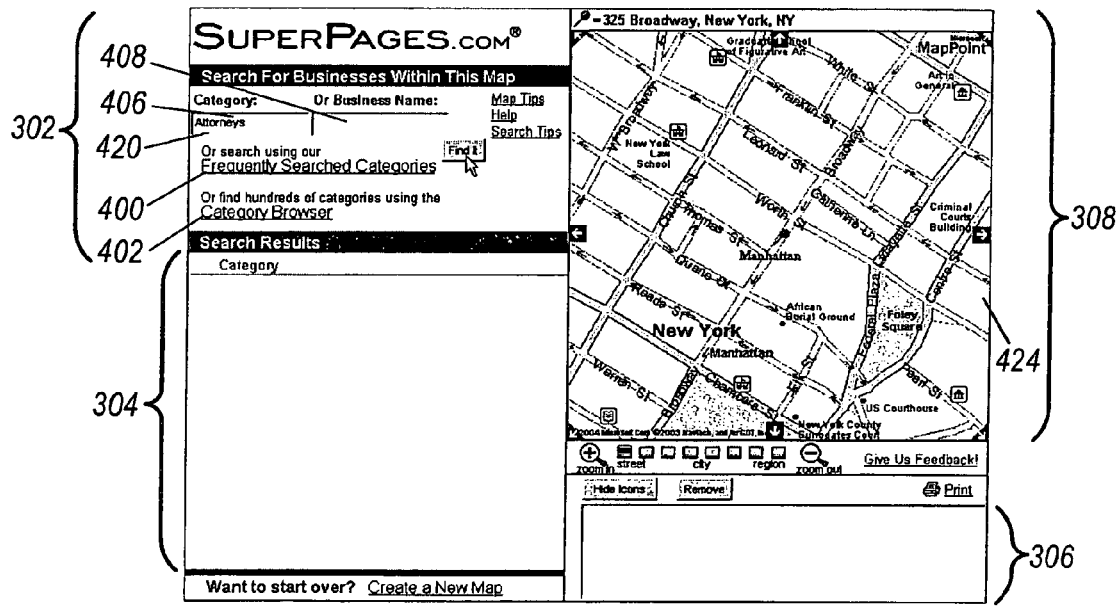
FIG. 4B depicts a graphical user interface according to some embodiments including a form for user input relating to categories or items to be searched.
Figure 4C:
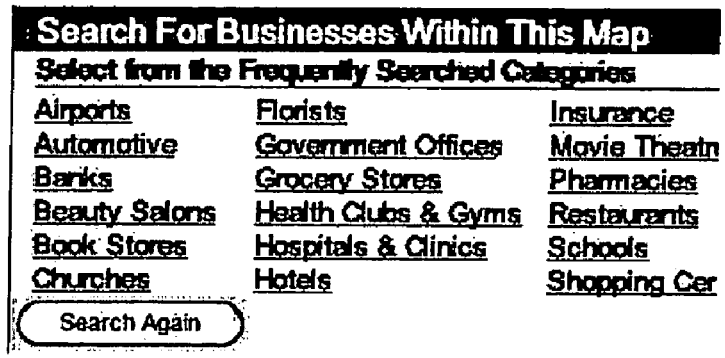
FIG. 4C depicts a portion of a graphical user interface according to some embodiments that displays a list of links to "frequently used categories".
Figure 4D:
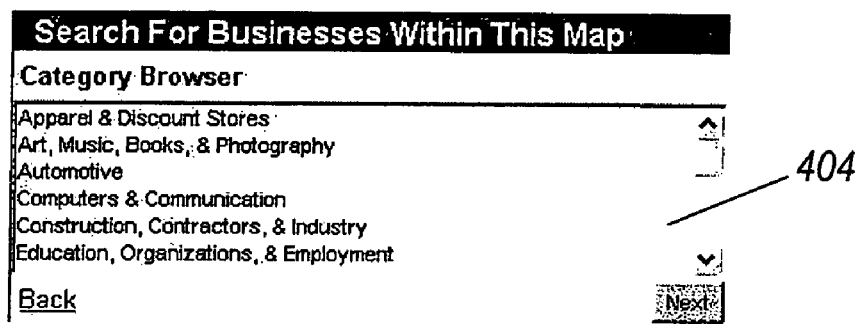
FIG. 4D depicts a category browser according to some embodiments displaying a list of category families.
Figure 4E:
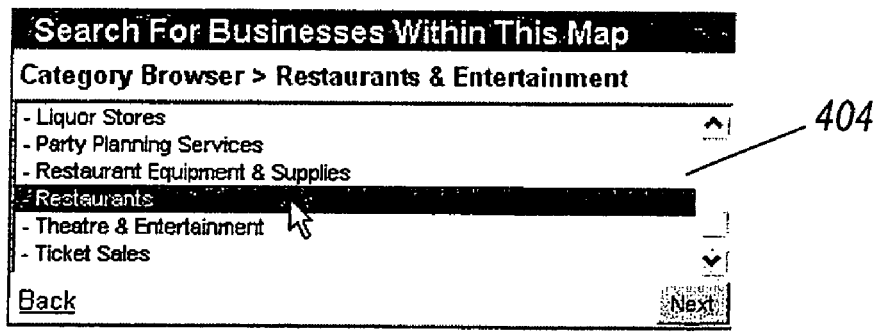
FIG. 4E depicts a category browser according to some embodiments after the user has navigated to a set of sub-families.
Figure 4F:
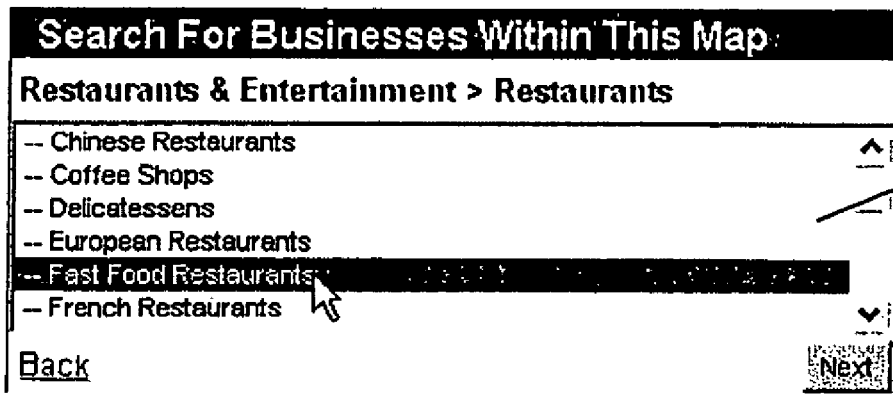
FIG. 4F depicts a category browser according to some embodiments after the user has navigated to a set of subcategories.
Figure 4G:
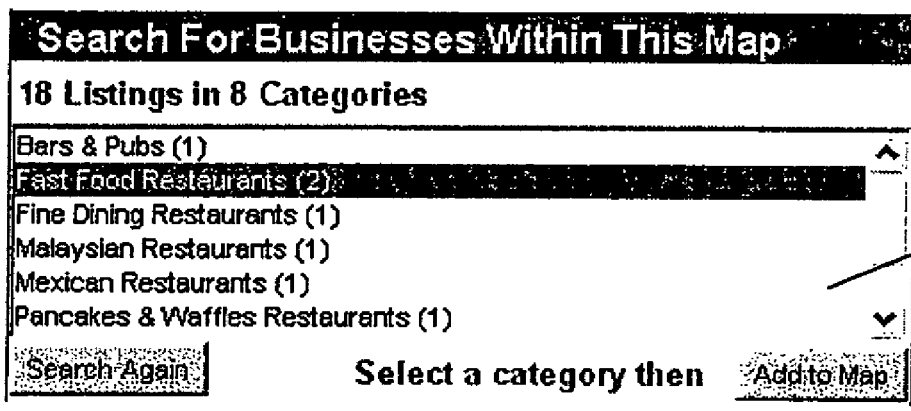
FIG. 4G depicts a category browser according to some embodiments when the user has navigated to a list of items by selecting a particular category.
Figure 4H:
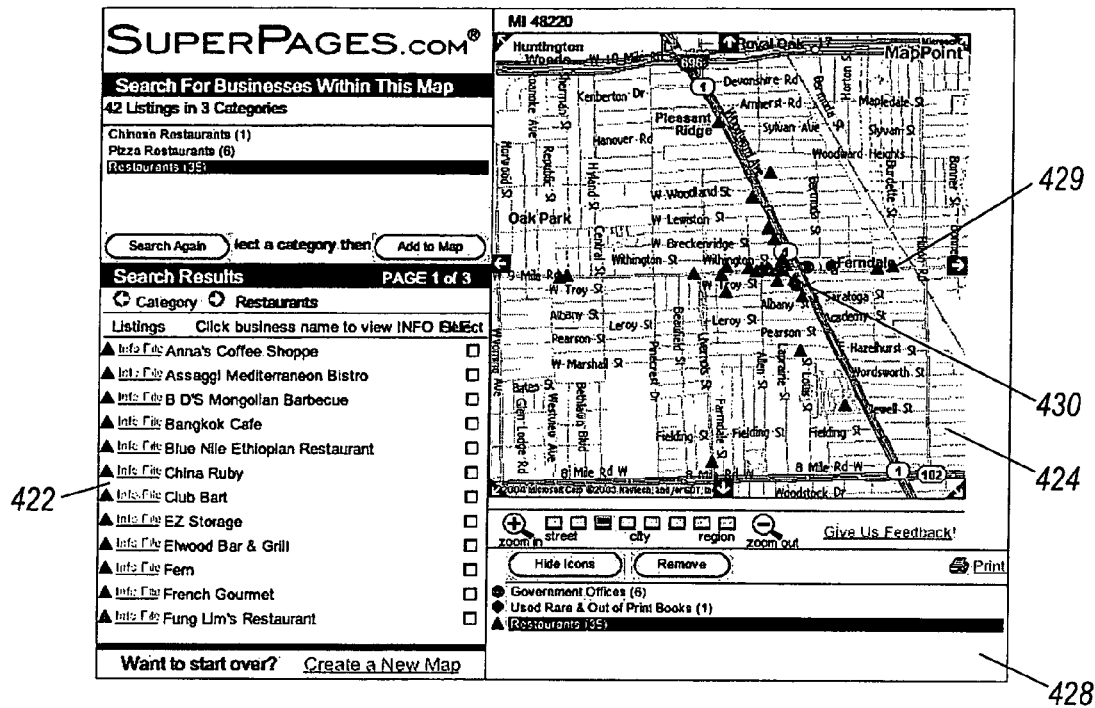
FIG. 4H depicts items displayed in item list and icons displayed over a map image according to some embodiments.

Category area 306 is used to contain a list 428 of category families 202, sub-families 204 (e.g., restaurant) and/or categories 206 (e.g., Cantonese Chinese restaurants) that have been located using one of the approaches above and are displayed on map image 424 in map display area 308 as shown in FIG. 4H.

Further, as shown in FIG. 4A, map display area 308 may be used to enable a user to indicate a geographic area of interest, which is then displayed pictorially in map image 424 in a manner as shown in FIG. 4B.

Exemplary Process Flow

Figure 5A:
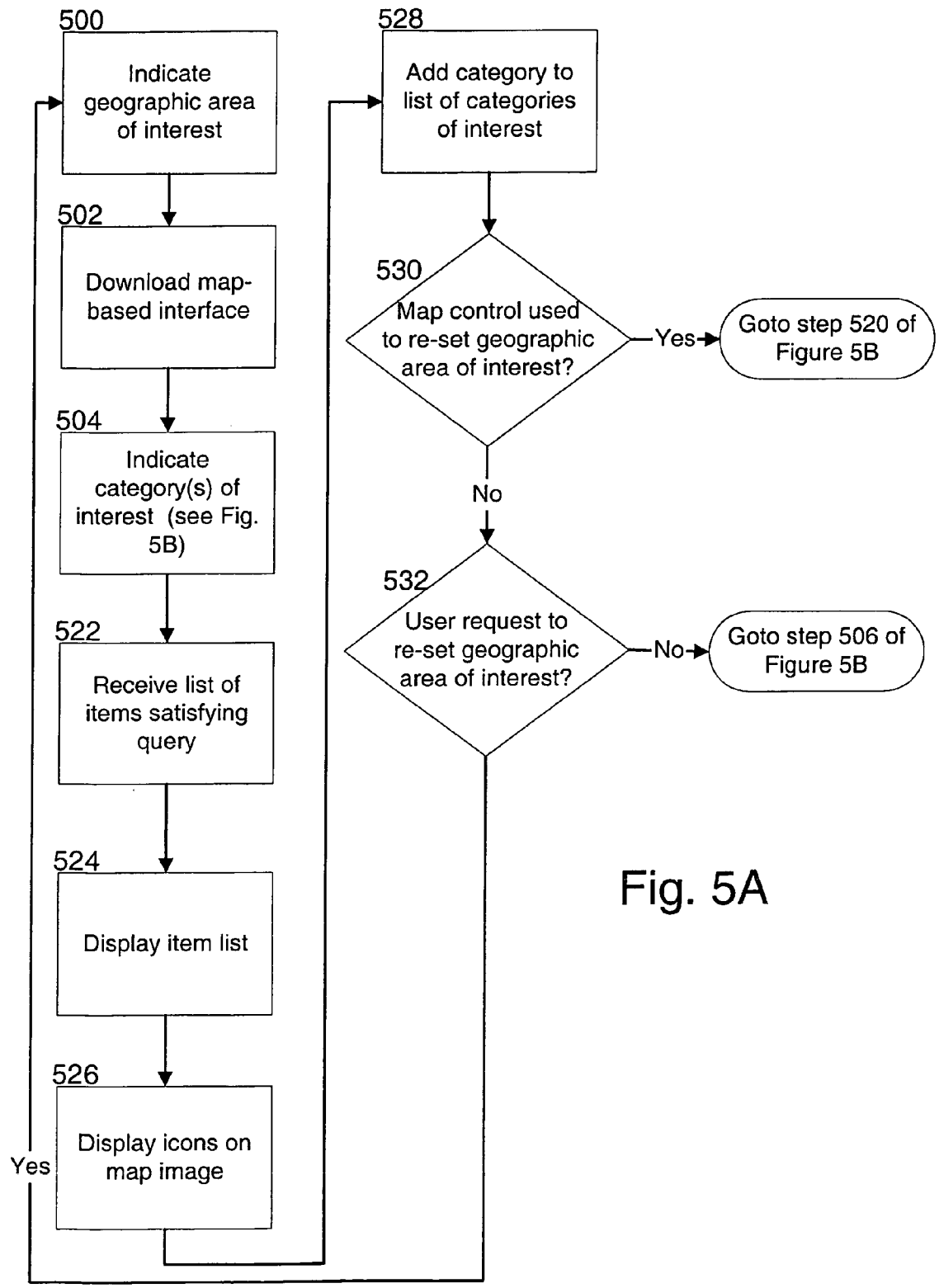
FIGS. 5A and 5B together illustrate an exemplary process flow of the map-based search application according to some embodiments.
Figure 5B:
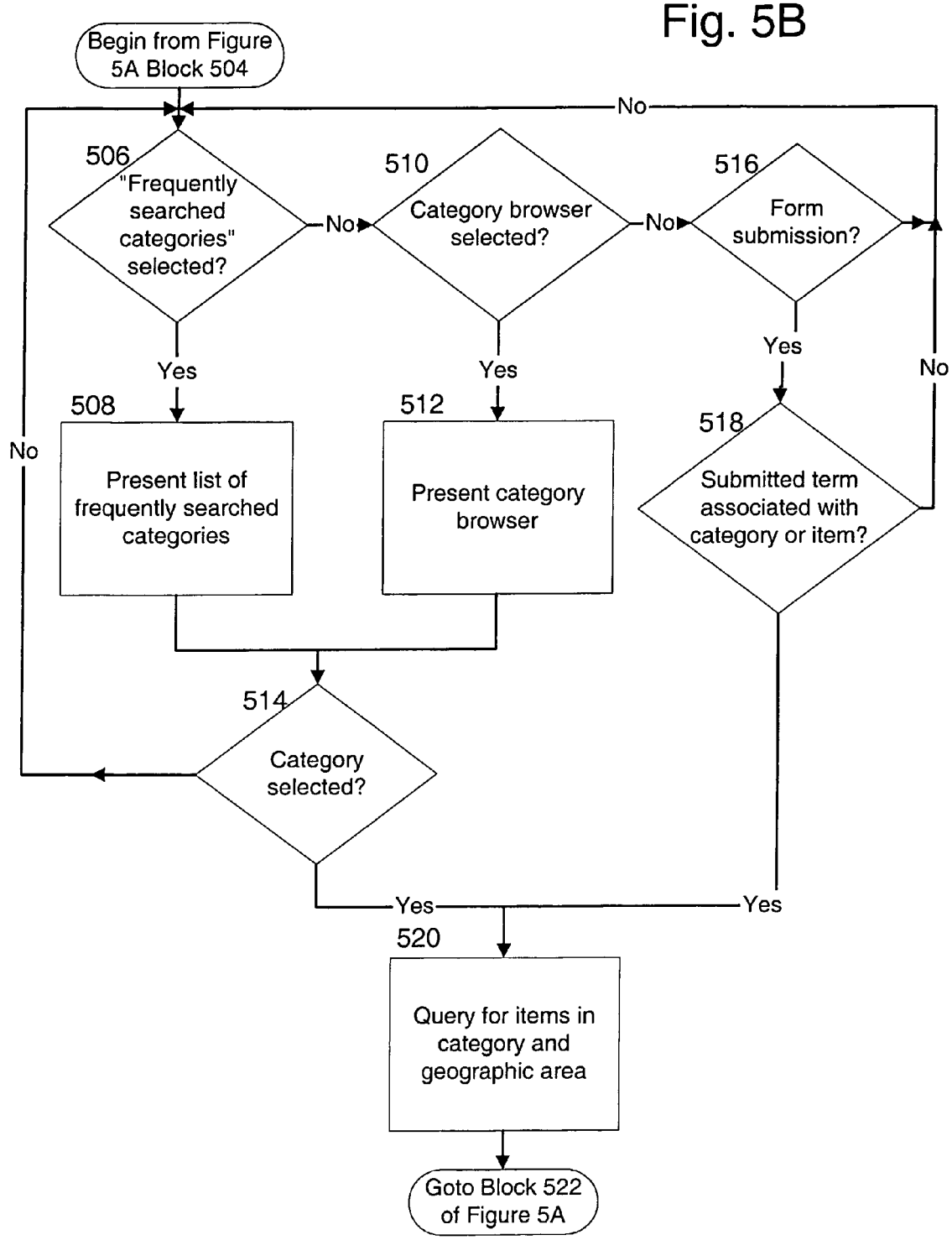

FIGS. 5A and 5B together illustrate an exemplary process flow of map-based search application 100. Those skilled in the art will understand that certain of the process steps described herein could be omitted, and that certain other process steps could be included, without departing from the scope of the present invention.

Turning first to FIG. 5A, in block 500, map-based search application 100 receives, generally from server 102 and/or client 103, an indication of a geographical area of interest, which is stored, generally in volatile memory, on server 102 and/or client 103. One presently practiced embodiment provides an end user at client 103 with a graphical user interface (GUI) such as the GUI represented in FIGS. 4A-4J. FIG. 4A depicts a portion of the GUI through which the user can indicate a street address, city, state, and/or zip code indicative of a geographic area of interest. Those skilled in the art will recognize that other information besides that listed here may be used to indicate a geographical area of interest.

In block 502, client 103 downloads map-based interface 300, displayed on display 104, and/or map-based search application 100. In general, map display area 308 will be configured to display a map representing the indicated areas of interest.

In one embodiment map-based search application 100, including map-based interface 300, is a computer program created using the JAVA® programming language, so that much of the processing required to support hierarchical map-based querying is performed on client 103, generally in conjunction with an Internet browser application running on client 103. However, those skilled in the art will recognize that the present invention may be implemented in various combinations of online application languages and protocols and is by no means constrained to implementation in Java. Further, those skilled in the art will understand that much of the processing described herein as taking place on client 103 could take place on server 102 and vice-versa. For example, map-based search application 100 could also be implemented in other "common gateway interface" (CGI) protocols such as simple HTML or DHTML interfaces on client 103. Also, map-based interface 300 could be linked to dynamic applications on server 102. Those skilled in the art will recognize that such implementations could use a variety of technologies, programming languages and/or scripting languages such as Java Server Pages, Active Server Pages, PERL, C, C++, Microsoft®.NET, etc.

Further, although FIG. 5A describes an indication of a geographical area of interest being provided before map-based interface 300 is downloaded to client 103, it should be understood that the order in which these steps occur is not critical to the operation of the invention. In fact, in one presently practiced embodiment, a geographical area of interest can be indicated from within map-based interface 300 as well as prior to map-based interface 300 being downloaded to client 103.

Returning to FIG. 5A, in block 504, a category 206 of interest and/or an item 208 of interest is indicated, generally by the user providing input through search area 302, which contains means for a user to indicate a category of interest and/or item of interest. The indicated category of interest must either be selected from or associated with a category 206. Generally, following the afore-mentioned user input, category 206 of interest and/or an item 208 of interest is received by map-based search application at client 103 and/or server 102.

Turning now to FIG. 5B, one possible process flow for indicating a category of interest and/or an item of interest is illustrated. In block 506, map-based search application 100 determines whether any inputs have been made in search area 302 indicating that the user would like to select from a list of "frequently searched categories" or the like. Means for making and receiving such an input will be known to those skilled in the art, and could include frequently searched categories link 400 shown in FIG. 4B.

If frequently searched categories link 400 is selected in block 506, control proceeds to block 508. In block 508, map-based interface 300, within category area 306, displays a list of links to "frequently used categories" from which a user may make a selection as shown in FIG. 4C. Such lists may be stored in information database 112, although they preferably are downloaded onto client 103 for efficient access by map-based search application 100. A list of frequently used categories may be created in a number of ways. For example, a list of frequently used categories may be generated from an analysis of information stored in information database 112 regarding how often each category 206 has been selected, or such a list may be created based on a system administrator's predictions of what categories 206 users are most likely to select.

If frequently searched categories link 400 is not selected in block 506, control proceeds to block 510. In block 510, map-based search application 100 determines whether any inputs have been made in search area 302 indicating that the user would like to browse or navigate categories. Means for making and receiving such an input will be known to those skilled in the art, and could include category browser link 402 shown in FIG. 4B. Hierarchical category index 200 is also stored in information database 112, but may be downloaded to client 103 for more efficient access by map-based search application 100, including when accessed to populate category browser 404.

If category browser link 402 is selected in block 510, control proceeds to block 512. FIG. 4D depicts category browser 404 displaying a list of category families 202. Category browser 404 allows a user to navigate to a set of category sub-families 204 by selecting a category family 202. Means for such selection in a graphical user interface will be well known to those skilled in the art, and might comprise, for example, moving a pointing device to indicate a particular category family 202, and double-clicking. FIG. 4E depicts category browser 404 after the user has navigated to a set of sub-families 204, and FIG. 4F depicts category browser 404 after the user has navigated to a set of subcategories 206, one level lower in hierarchical category index 200. Similarly, FIG. 4G depicts category browser 404 when the user has navigated to a list of items 208 by selecting a particular category 206.

Following each of blocks 508 and 512, control proceeds to block 514. In block 514, map-based search application 100 determines whether a category has been selected as the result of user input or inputs. If no, control returns to block 506. If yes, control proceeds to block 520, discussed below.

In block 516, the process determines whether the user has entered a category in category box 406 or an item in item box 408 to be searched for within the indicated geographical area of interest, as depicted in FIG. 4B. In some embodiments, if the user has entered search terms in both category box 406 and item box 408, map-based search application 100 will use the term entered in category box 406 to provide the user with the broadest search possible. In some embodiments, if the search term indicated in category box 406 yields no results, map-based search application 100 will use then use the term entered in item box 408 to see if any items satisfy the user's query. Embodiments are also possible in which terms provided in category box 406 and item box 408 are both used, and results provided together.

In block 518, the process determines whether a term submitted in category box 406 or item box 408 is found in information database 112. Searches based on terms entered in category box 406 rely on a synonym table, generally stored in information database 112, although in some embodiments the synonym table is downloaded onto client 103 for efficient access by map-based search application 100. The synonym table contains identifiers associated with each category family 202, sub-family 204 and category 206. The synonym table further associates each such identifier with synonyms for the names of the category families 202, sub-families 204, and/or categories 206 associated with the identifier. Thus, if a user enters a word into category box 406 that describes, but does not match a name of a category family 202, sub-family 204, or category 206, it is still possible to identify a category of interest for the user if the entered word is also stored in the synonym table. If no match is found, control returns to block 506, possibly after displaying a message on map-based search interface 300 that no match has been found. If a match is found, control proceeds to block 520.

In block 520, map-based application 100 creates a search query for items 208 located within the indicated geographic area of interest and associated with the indicated category of interest. Map-based application 100 then submits this query, possibly via server 102, to information database 112. As a practical matter, the query generally seeks all items 208 associated with the indicated category of interest that are within a specified distance of the submitted geo-coordinate. The specified distance is generally determined according to the resolution, or "zoom factor" of the map displayed in map display area 308. That is, higher map resolutions result in maps that encompass less distance and therefore are associated with lower predetermined distances.

Returning to FIG. 5A, in block 522, map-based application 100 receives a list of items 208 satisfying the query formulated in block 520, along with a geo-coordinate associated with each item 208.

In block 524, items 208 are displayed as item list 422 in search results area 304, an example of such a display being given in FIG. 4H. The display of items 208 in search results area 304 is optional, but preferred.

In block 526, map-based application 100 uses the geo-coordinates of each item 208 satisfying the query of block 520 to plot and display, using icons 429, as seen in FIG. 4H, the location of each returned item 208 on map image 424 that is displayed in map area 308. In preferred embodiments the process described with respect to FIG. 5B can be executed a plurality of times, allowing items 208 in more than one category 206 to be added to the map that is displayed in map area 308. Accordingly, FIG. 4H shows an example of locations of items 208 displayed on a map using icons 429 of various shapes associated with various categories 206 or items 208.

Figure 4I:
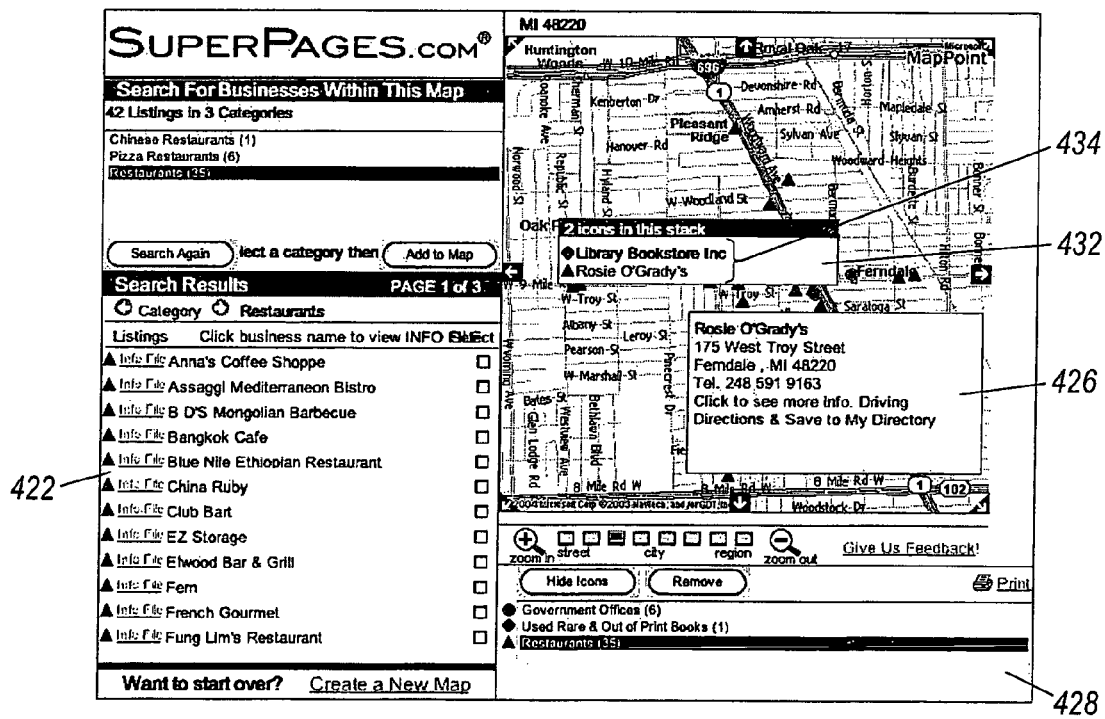
FIG. 4I illustrates the ability to present information relating to stacked icons presented on a map image according to some embodiments.

As is discussed in more detail below, when a user moves a mouse or other pointing device over an icon 429, overlay box 426, depicted in FIG. 4I, is presented over map image 408.

As is also discussed in more detail below, when icons 429 representing different items 208 overlap when placed on map image 408, an icon stack 430 is created. Generally when icons overlap, icons associated with the last category 206 selected for display on map image 408 are displayed over icons 429 associated with other categories 206. However, those skilled in the art will recognize that other rules for the display of overlapping icons 429 are possible.

In block 528, the category 206 associated with items 208 received in block 508 is added to a list of categories 428 that are represented on the map that is maintained by map-based application 100 and displayed in category window 306. FIG. 4H shows an example of how map-based interface 300 might display such a list of categories 428.

Search Using Pan and Zoom

In Block 530 the process described with reference to FIG. 5A determines whether the user has used a map control or controls to reset the geographic area of interest. If yes, control proceeds to block 520 as described in more detail below. If not, control proceeds to block 532.

Figure 4J:
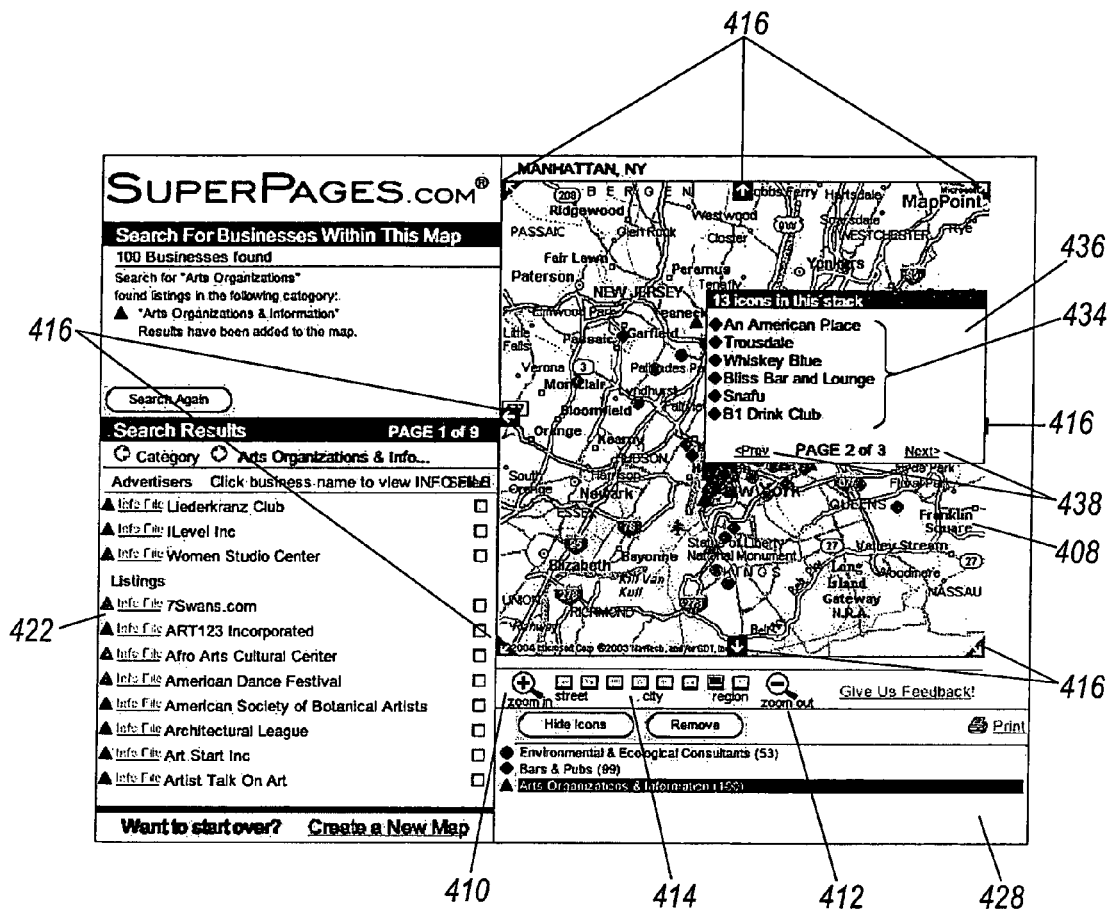
FIG. 4J shows paged interstitial navigation box configured to display up to six descriptions at a time according to some embodiments.

FIG. 4J depicts map image 408 presented with various map controls, all of which will be known to and understood by those skilled in the art. Zoom in button 410, when selected, causes image 408 to display a smaller area at a higher resolution. Conversely, zoom out button 412, when selected, causes map image 408 to display a larger area at a lower resolution. Resolution buttons 414, when selected, cause map image 408 to display an area of a specified size associated with the particular resolution button 414 that has been selected. Pan buttons 416 allow for moving the geographic area displayed by map image 408 east, northeast, southeast, west, northwest, southwest, north, and south respectively. Also, the map can be caused to pan by clicking a pointing device on any portion of the map image, thus re-centering the map at the location that was indicated by the pointing device. Accordingly, it will be understood that when any of zoom in button 410, zoom out button 412, resolution buttons 414, or pan buttons 416 are used, the indicated geographic area of interest will change.

A novel feature of the present invention is that, upon receiving an indication that the geographic area of interest has changed, map-based search application 100 automatically performs the search described above with reference to block 520 of FIG. 5B using the newly indicated geographic area of interest and the currently indicated categories 206 of interest, i.e., in some embodiments, the categories 206 listed in list of categories 428. Following execution of the search described with reference to block 520, the process flow is generally as described above, i.e., control proceeds to block 522 of FIG. 5A as depicted above, and so forth.

In block 532, map-based search application 100 determines whether the user has made a request for the indication of a new geographic area of interest. Means for a user to do so will be well known to and understood by those skilled in the art and could include, for example, a create new map link 418 as shown in FIG. 4B. If no, control proceeds to block 506 described with reference to FIG. 5B. If yes, control returns to block 500.

Icon-Stacking Functionality

FIGS. 4H, 4I, and 4J illustrate another novel feature of the present invention, namely the ability to present information relating to specific icons 429 presented on map image 408 even where those icons 429 overlap. The result is a "stack" of icons 429 such as icon stack 430, shown in FIG. 4H. Those skilled in the art will recognize that there will be various possible methods of determining whether icons overlap. Some examples of such methods are given in the following paragraphs.

In preferred embodiments an icon stack 430 is created whenever two or more items 208 to be represented on map image 408 share the same geographic location. Those skilled in the art will recognize various methods of determining whether items 208 share a geographic location, including determining whether the items 208 have the same street address, same geo-coordinate, etc.

Further, in one present embodiment, a determination of whether a set of icons 429 overlap and thus constitute an icon stack 430 is made by first locating the center point of each icon 429 that is displayed or to be displayed on map image 408. If an icon 429 is of a shape different than a circle (e.g., a star, diamond, square, triangle, etc.), a reference circle, i.e., a virtual circle that is never displayed on map image 408, is drawn from the center point of icon 429, where the radius of the reference circle extends to the corners of the shape used for the icon 429. Next, it is determined whether the reference circles of any icons 429 overlap. Icons 429 whose associated reference circles overlap then are determined to constitute an icon stack 430. In one embodiment, icons 429 are determined to overlap if any of there are any pixels on map image 408 common to their respective circles. Note that it is possible for one icon 429 to be included in more than one icon stack 430 where the circle for the icon 429 overlaps with two other circles for two other icons 429 that do not overlap with each other.

When a user moves a mouse or other pointing device over icon 429, overlay box 426, depicted in FIG. 4I, is presented over map image 408. As can be seen, overlay box 426 contains information about an item 208 whose location is shown on map image 408. For example, as shown in FIG. 4I, overlay box 426 provides basic information about item 208, including an address and telephone number as well as links to even more information about item 208.

However, when a user moves a mouse or other pointing device over icon stack 430, interstitial navigation box 432 is presented over map image 408. Interstitial navigation box 432 is so-named because it is presented at the interstice of the presentation of map image 408 and the presentation of information about an item 208. Interstitial navigation box 432 contains a list of descriptions 434 of items 208. When a user moves a mouse or other pointing device over each of descriptions 434, an overlay box 426 is presented over map image 408. Further, each of descriptions 434 may also be a link that when clicked on enables navigation to a new screen and/or pop-up window containing additional information about the item 206 associated with the description 434, such as hours of operation, driving directions, or any other information about the item 206.

Interstitial navigation box 432 will generally display a message such as is seen in FIG. 4I indicating the number of icons 429 in the icon stack 430 indicated by the user's pointing device. Of course, there will be practical limitations to the possible size of interstitial navigation box 432 and thus to how many items 208 may be included in the list of descriptions 208. Accordingly, in one embodiment, paged interstitial navigation box 436 is configured to display up to six descriptions 432 at a time, as is seen in FIG. 4J. Thus, as seen in FIG. 4J, when icon stack 430 represents more than six items 206, paged interstitial navigation box 436 will include navigation controls such as "prey" and/or "next" navigation links 438 to enable the user to navigate through the entire list of descriptions 432 associated with a particular icon stack 430. Further, as is also shown in FIG. 4J, paged interstitial navigation box 436 will generally display a message indicating the number of pages of descriptions 432 it contains, as well as an indication of which page in the sequence is presently being viewed.

CONCLUSION

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field map-based category searching, and that systems and methods will be incorporated into such future embodiments. Accordingly, it will be understood that the invention is capable of modification and variation and is limited only by the following claims.

We claim:

1. A system, comprising:
geographic data;
category data organized according to a hierarchical category index;
categorized data comprising at least one item associated with each of the geographic data and the category data; and
a server device that is configured to provide the hierarchical category index to a client, and to further provide to the client, in response to a query that includes a geographic area of interest and a category of interest, a list of items that includes all of the items in the response, wherein, upon receipt by the client and without user intervention, each item included on the list of items is included in a map display in the client,
the server device being further configured to receive as part of the query a search term provided as a category input and an item term provided as an item input, and to use the item term to search for items to be included in the response if the search term provided as a category input does not yield a result.

2. The system of claim 1, wherein the geographic data comprises at least one geo-coordinate associated with at least one location on a map.

3. The system of claim 1, wherein the map display includes a map image comprising a representation of the geographic area of interest and at least one icon representing the location of the at least one item.

4. The system of claim 3, wherein the map image comprises a plurality of icons representing the locations of a plurality of items.

5. The system of claim 4, wherein at least one of the items is associated with a plurality of categories.

6. The system of claim 4, wherein at least one of the items is associated with a single category.

7. The system of claim 1, further comprising an information database that stores at least some of the category data and at least some of the geographic data.

8. The system of claim 1, further comprising a map database that includes at least some of the geographic data.

9. The system of claim 1, further comprising a category browser that is included in the display and that allows a user to make a selection from the category data.

10. The system of claim 1, the server device being further configured to determine whether the category input is stored in a synonym table.

11. A method, comprising:
receiving from a client, in a server device, a geographic area of interest;
providing, to the client, a hierarchical category index;
receiving, from the client, a category of interest, wherein the category of interest is included in the hierarchical category index;
receiving, from the client, an item of interest, and using the item of interest to search for items to be included in the response as related to the category of interest if the input provided as the category of interest does not yield a result;
generating a list of items according to the geographic area of interest and the category of interest;
providing the list of items, including all of the items that were generated, to the client, wherein, upon receipt by the client and without user intervention, each item included on the list of items is displayed by the client in a map display.

12. The method of claim 11, further comprising displaying in the map display a map image that comprises a representation of the geographic area of interest and at least one icon representing a location of at least one of the items.

13. The method of claim 12, further comprising including in the map image a plurality of icons representing the locations of the items.

14. The method of claim 11, wherein at least one of the items is associated with a plurality of categories.

15. The method of claim 11, wherein at least one of the items is associated with a single category.

16. The method of claim 11, wherein the map display is displayed in a web browser.

17. The method of claim 11, further comprising storing at least some of the category data and at least some of the geographic data in an information database.

18. The method of claim 11, further comprising storing at least some of the geographic data in an information database.

19. The method of claim 11, further comprising providing a category browser to be included in the display that allows a user to make a selection from the category data.

20. The method of claim 11, tangibly embodied as computer-executable instructions on a computer-readable medium.

21. A system, comprising:
geographic data;
category data organized according to a hierarchical category index;
categorized data comprising at least one item associated with each of the geographic data and the category data;
a server device that is configured to provide the hierarchical category index to a client, and to further provide to the client, in response to a query that includes a geographic area of interest and a category of interest, a list of items that includes all of the items in the response, wherein, upon receipt by the client and without user intervention, each item included on the list of items is included in a map display in the client, the server device being further configured to receive as part of the query a search term provided as a category input and an item term provided as an item input, and to use the item term to search for items to be included in the response if the search term provided as a category input does not yield a result;
an information database that stores at least some of the category data and at least some of the geographic data;
a map database that includes at least some of the geographic data; and
a category browser that is included in the display and that allows a user to make a selection from the category data.

22. A system, comprising: a client device, including processor and a non-transitory memory that stores instructions executable by the processor, the instructions including instructions for:
providing, to a server device, an indication of a first geographical area of interest;
receiving, from the server device in response to the indication, a map control that includes a map interface presenting a map for user interaction;
receiving input of a category of interest;
receiving input of an item of interest, and using the item of interest to search for items to be included in the response as related to the category of interest if the input provided as the category of interest does not yield a result;
providing a first list of items that are located in the first geographic area of interest and related to the category of interest;
displaying the first list of items along with an icon on the map for each the items in the first list of items, each icon representing a geographic location of a respective item; and
determining if input has been received via the map control to re-set the first geographical area of interest to a second geographical area of interest, and, if so, submitting to the server device a query requesting a second list of items, the second list of items to include items in the category of interest that are also in the second geographic area of interest.

23. The system of claim 22, the client device further including instructions for:
receiving, from the server device, the second list of items; and
displaying the second list of items along with an icon on the map for each the items in the second list of items, each icon representing a geographic location of a respective item.

* * * * *

UNITED STATES PATENT AND TRADEMARK OFFICE
CERTIFICATE OF CORRECTION

PATENT NO. : 8,346,751 B1
APPLICATION NO. : 10/872051
DATED : January 1, 2013
INVENTOR(S) : Zhiying Jin et al.

It is certified that error appears in the above-identified patent and that said Letters Patent is hereby corrected as shown below:

On the title page, item (54) and in the specification, column 1, title should be listed as follows:

"HIERARCHICAL CATEGORY INDEX NAVIGATIONAL SYSTEM"

Signed and Sealed this
Sixteenth Day of July, 2013

Teresa Stanek Rea
*Acting Director of the United States Patent and Trademark Office*